United States Patent [19]
Sitzler et al.

[11] Patent Number: 4,564,279
[45] Date of Patent: Jan. 14, 1986

[54] PHOTOGRAPHIC CAMERA

[75] Inventors: Klaus Sitzler; Kurt Steisslinger, both of Stuttgart, Fed. Rep. of Germany

[73] Assignee: Eastman Kodak Company, Rochester, N.Y.

[21] Appl. No.: 674,905

[22] Filed: Nov. 26, 1984

[30] Foreign Application Priority Data

Feb. 8, 1984 [DE] Fed. Rep. of Germany ....... 3404410

[51] Int. Cl.⁴ .............................................. G03B 1/28
[52] U.S. Cl. ................................................... 354/214
[58] Field of Search ............................... 354/212–214, 354/173.1, 288

[56] References Cited

U.S. PATENT DOCUMENTS

| | | | |
|---|---|---|---|
| Re. 26,181 | 4/1967 | Harvey et al. | 95/31 |
| 1,676,037 | 7/1928 | Lowkrantz | 354/212 |
| 2,591,417 | 4/1952 | Frye | 95/31 |
| 3,682,408 | 8/1972 | Sorimachi | 354/214 X |
| 4,469,421 | 9/1984 | Kamata | 354/212 |

Primary Examiner—John Gonzales
Attorney, Agent, or Firm—Roger A. Fields

[57] ABSTRACT

In a photographic camera, closing sliding movement of a camera back moves a film-engaging member mounted on the back to thread a film leader from a film cartridge to a take-up drum. At the completion of closing movement of the camera back, a separator disengages the film-engaging member from the leader. This permits the take-up drum to advance an unexposed section of the film from the cartridge and to wind an exposed section of the film onto the drum, each time the drum is rotated. A rewind member is provided for rewinding the exposed film into the cartridge by rotating a film spool connected in the cartridge to an end portion of the film. An actuator on the camera back moves the rewind member into engagement with the spool in response to closing movement of the camera back. The engagement secures the cartridge in place during advancement of the film to the take-up drum, and permits the rewind member to rotate the spool to rewind the film into the cartridge.

7 Claims, 8 Drawing Figures

PHOTOGRAPHIC CAMERA

BACKGROUND OF THE INVENTION

1. Field of the Invention

The invention relates generally to photographic cameras, and more particularly to film threading and film rewind means in such cameras.

2. Description of the Prior Art

The film loading procedure for many 35 mm cameras, such as the Nikon single-lens-reflex models, e.g., the Nikon FA, is substantially the same. This procedure is typically as follows:

1. the film rewind knob is pulled up from the camera body, partially withdrawing the rewind key shaft from the film cartridge chamber;
2. the camera back is pivoted open;
3. the film cartridge is positioned in the cartridge chamber with the film leader pointing towards the take-up drum in the film take-up chamber;
4. the rewind knob is pushed down, moving the keyed end of the rewind shaft into a keyhole in one end of the film spool in the cartridge, and thereby securing the cartridge in place;
5. the film leader is pulled across the exposure frame located between the cartridge chamber and the take-up chamber, and is secured to the take-up drum; and
6. the camera back is closed.

To unload the film from the camera, after the film (except for an end portion secured to the film spool in the cartridge) has been exposed and wound onto the take-up drum, the rewind knob is rotated in the direction indicated by an arrow on the knob. Since the film spool will be similarly rotated, the film is rewound from the take-up drum into the cartridge. Then, the rewind knob is pulled up from the camera body, removing the keyed end of the rewind shaft from the keyhole in one end of the film spool, and the camera back is opened, thereby permitting the cartridge to be removed from the cartridge chamber.

Each of the steps in these procedures for film loading and film unloading, though relatively easy to follow, must be done manually and in the specified order. Thus, there are presented certain limitations or shortcomings. For example, successful film loading and unloading requires that the operator strictly adhere to the respective procedures. The omission of a step in either one of the procedures, or a deviation from the step, will result in a problem. Moreover, as with any manual procedure, a certain amount of attention and skill is required.

SUMMARY OF THE INVENTION

The invention simplifies film loading in a photographic camera of the type provided with (a) a chamber adapted to receive a film cartridge having an engageable spool about which the film is wound, (b) take-up means for advancing the film from the cartridge, (c) a rewind member movable in the chamber into engagement with the spool for securing the cartridge in place during advancement of the film from the cartridge and for rotating the spool to rewind the film into the cartridge, and (d) a camera back movable to open and close the chamber, by the improvement comprising:

means supporting the camera back for closing movement in the same direction the take-up means advances the film from the cartridge;

motion imparting means for moving the rewind member into engagement with the spool in response to closing movement of the camera back; and threading means connected to the camera back for engaging the film to thread the film to the take-up means during closing movement of the camera back.

According to the invention, therefore, closing movement of the camera back (i) effects movement of the rewind member into engagement with the spool in the cartridge to secure the cartridge in place and (ii) causes the film leader to be threaded from the cartridge to the take-up means. Thus, except for inserting the cartridge in the chamber and closing the camera back, film loading is effected automatically, rather than manually as in the prior art procedure described above.

In a preferred embodiment of the invention, cooperating means connected to the rewind member and the camera back couple the two to move the rewind member into engagement with the spool in the cartridge in response to closing movement of the camera back, and uncouple the two to permit the rewind member to be moved out of engagement with the spool in response to opening movement of the camera back. Spring means urge the rewind member to move out of engagement with the spool. Thus, the rewind member is moved into and out of engagement with the spool (to secure and release the cartridge) in response to closing and opening movement of the camera back, respectively, thereby facilitating film unloading as well as film loading.

DESCRIPTION OF THE PREFERRED EMBODIMENT

The invention is described as being embodied in a 35 mm camera. Because such cameras are well known, this description is directed in particular to camera elements forming part of or cooperating directly with the preferred embodiment. It is to be understood, however, that camera elements not specifically shown or described may take various forms known to persons of ordinary skill in the camera art.

Figure 1:
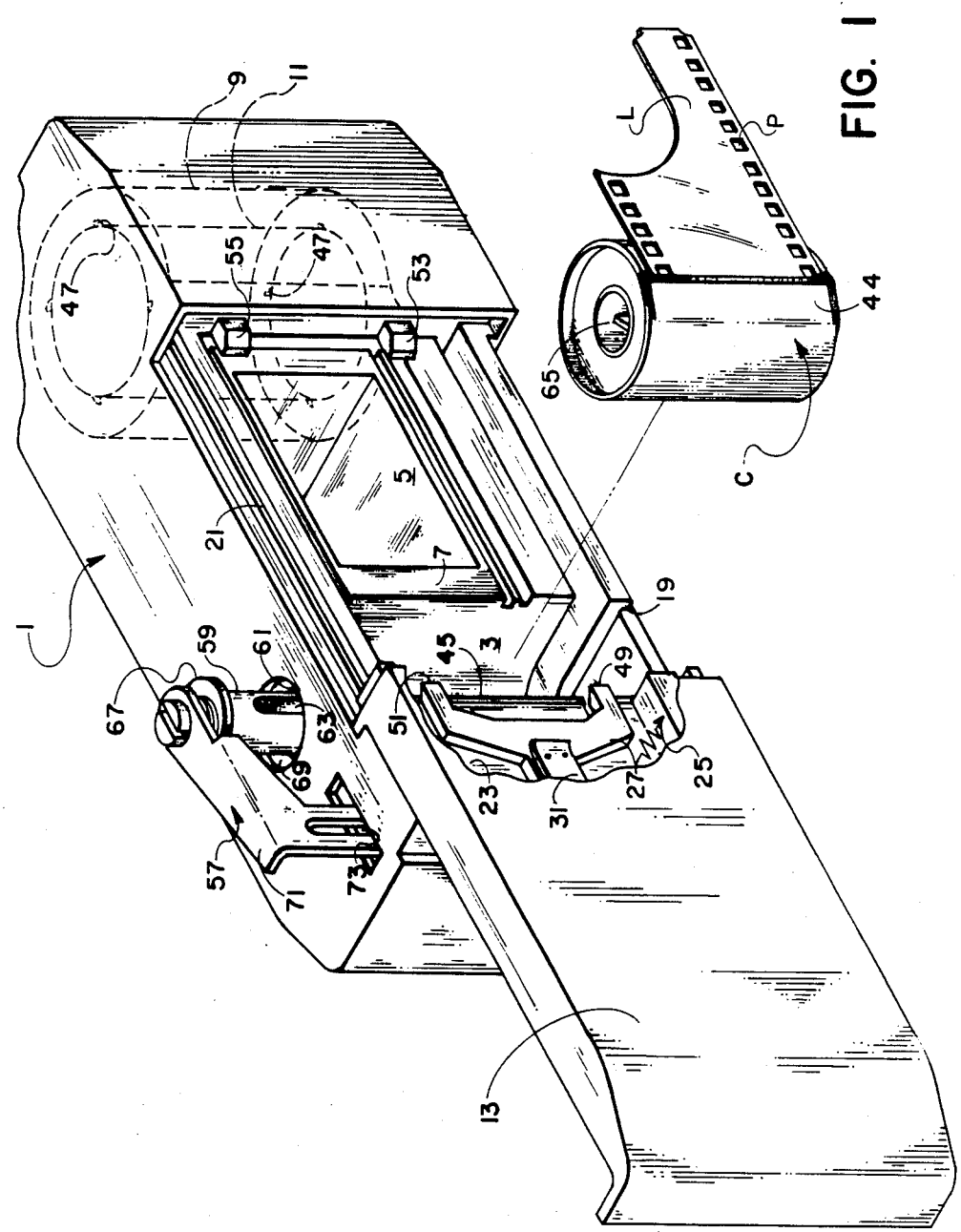
FIG. 1 is a rear perspective view of a photographic camera according to a preferred embodiment of the invention.
Figure 2:
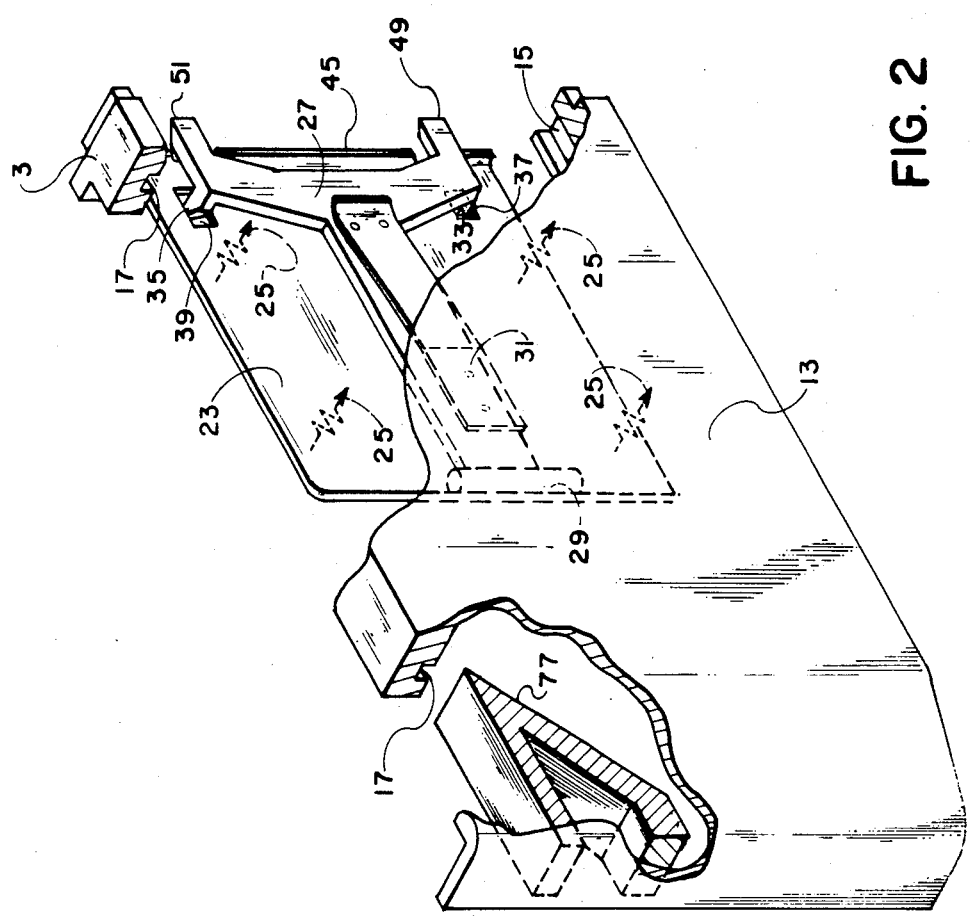
FIG. 2 is a partial view similar to FIG. 1, showing a film threading mechanism in the camera, and a detail of actuating means for moving a film rewind mechanism into and out of engagement with a film cartridge in the camera.

Referring now to the drawings and in particular to FIGS. 1 and 2, there is shown the back portion of a 35 mm camera. A camera body 1 includes a film cartridge chamber 3 adapted to receive a conventional 35 mm film cartridge C, a film exposure window 5 generally defined by an exposure frame 7, and a film take-up chamber 9. A take-up drum 11 is supported for rotation within the take-up chamber 9. The drum 11 is rotated after each film exposure by manually operated or motorized means, not shown, to wind an exposed section of the film onto the drum and to advance an unexposed section of the film onto the exposure frame 7. A camera back 13 has a pair of parallel extending grooves 15 and 17 which receive respective rails 19 and 21 on the camera body 1, thereby slidably supporting the camera back for movement to open and close the back portion of the camera body 1. FIG. 1 shows the camera back 13 in a fully opened position, revealing the cartridge chamber 3 and the exposure frame 7. A film pressure plate 23 is supported in spaced relation on the camera back 13 by four springs 25 to hold an exposed section of the film flat, at the exposure window 5, on the exposure frame 7. Between the pressure plate 23 and the camera back 13, there is provided a film threading claw 27. The threading claw 27 is pivotally mounted on a pin 29 and is urged by a spring 31 to extend a pair of film-engaging projections 33 and 35 on the claw through respective openings 37 and 39 in the pressure plate 23.

Figure 3:
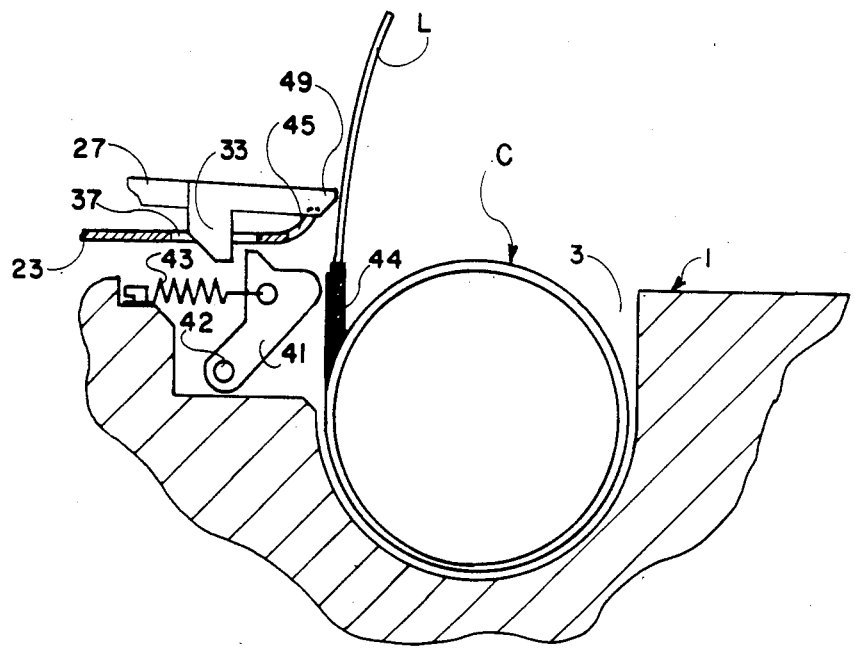
FIGS. 3 and 4 are schematic views of a film cartridge chamber and a cartridge aligning mechanism in the camera, illustrating operation of the aligning mechanism.
Figure 4:
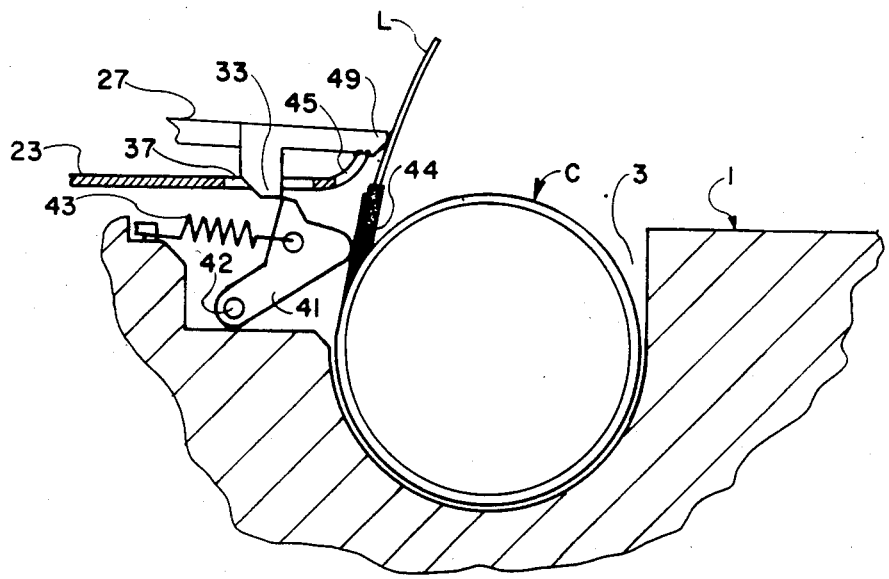

As shown in FIGS. 3 and 4, a cartridge aligning member 41 is pivotally mounted on a pin 42 at a location adjacent the cartridge chamber 3. Should a film cartridge C be inadvertently positioned in the cartridge chamber 3 such that the film leader L does not point towards the take-up drum 11 in the take-up chamber 9, initial closing movement of the camera back 13 will cause the projection 33 on the claw 27 to pivot the aligning member 41, against the contrary urging of a return spring 43 for the member, from an original position, shown in FIG. 3, to an aligning position, shown in FIG. 4; whereupon, the film cartridge will be rotated to position its throat 44 in the oncoming path of a curved forward end portion 45 of the pressure plate 23. Then, continued closing movement of the camera back 13 will cause the forward end portion 45 of the pressure plate 23 to rotate the film cartridge C to its intended orientation, shown in FIG. 5, in which the film leader L is pointed towards the take-up drum 11 in the take-up chamber 9.

Figure 5:
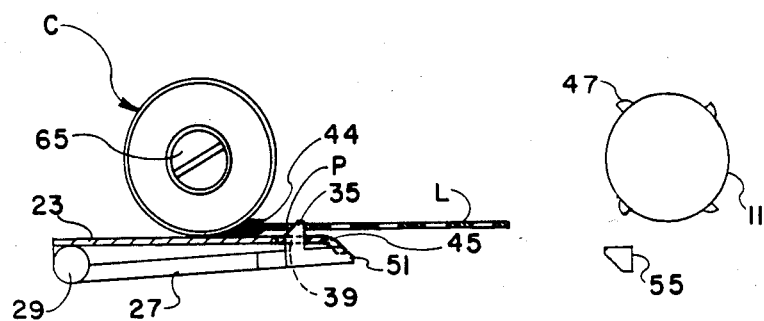
FIGS. 5, 6, and 7 are schematic views of the film threading mechanism, illustrating operation of such mechanism.
Figure 6:
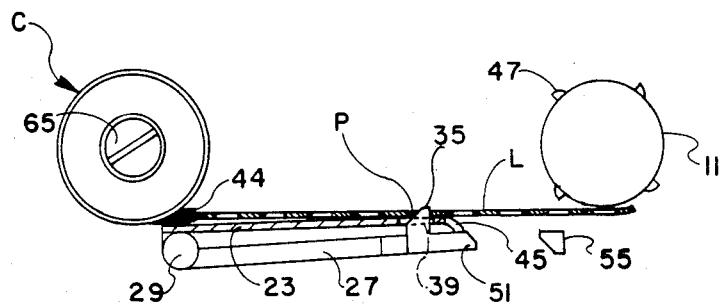
Figure 7:
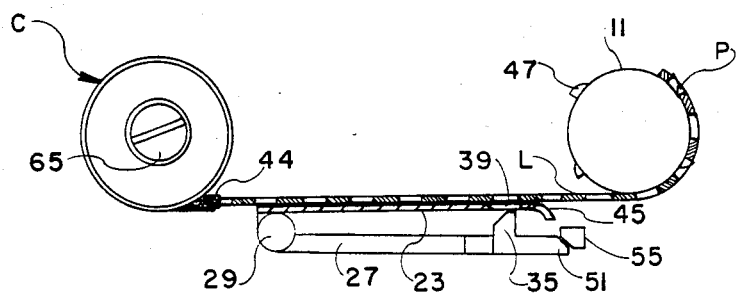

During closing movement of the camera back 13, as shown in FIGS. 5-7, the film-engaging projections 33 and 35 on the threading claw 27 will first rest on the film leader L and will then drop into respective perforations P in the film leader, to thereby engage the leader. Once engaged, the film leader L will be pulled over the exposure frame 7 in the same direction as closing movement of the camera back 13 and will be inserted into the take-up chamber 9. The take-up drum 11 in the take-up chamber 9 includes a plurality of engagement teeth 47 for engaging the film leader L at its perforations P in response to initial rotation of the drum. As closing movement of the camera back 13 is completed, a pair of forward extending fingers 49 and 51 on the claw 27 will ride up respective ramps 53 and 55 located on the camera body 1 adjacent the take-up chamber 9; whereupon, the claw will be pivoted about the pin 29 to separate the film-engaging projections 33 and 35 from the film leader L. Thus, the projections 33 and 35 will be prevented from interfering with the winding of an exposed section of the film onto the take-up drum 11 each time the drum is rotated.

Figure 8:
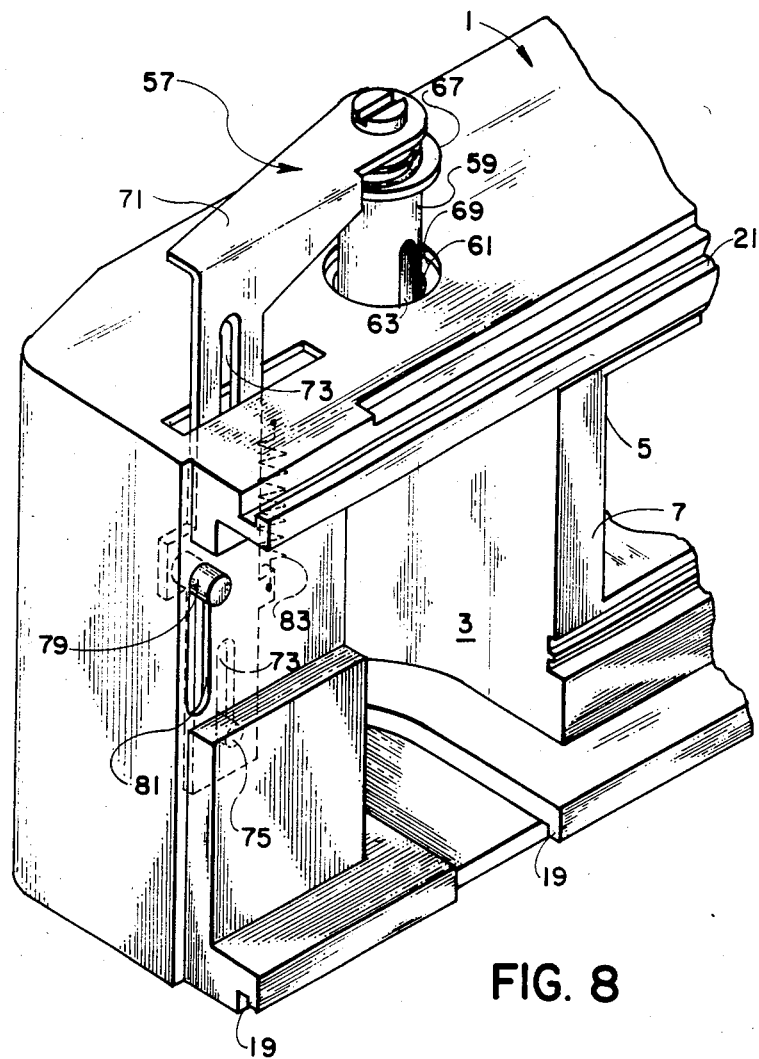
FIG. 8 is a partial view similar to FIG. 1, illustrating the film rewind mechanism.

As shown in FIGS. 1 and 8, a film rewind mechanism 57 includes a rotatably supported rewind shaft 59 which is movable into the cartridge chamber 3 through an opening 61 in the camera body 1 to engage a film spool, not shown, in the film cartridge C. Movement of the rewind shaft 59 into the cartridge chamber 3 causes a keyed end portion 63 of the shaft to be inserted into a keyhole 65 in one end of the film spool, thereby effecting engagement of the shaft with the spool. Moreover, such movement causes an annular cap 67 on the rewind shaft 59 to be inserted into a similarly shaped recess 69 adjacent the opening 61 in the camera body 1, thereby light-sealing the opening. The rewind shaft 59 is engaged with the film spool in the cartridge C for two purposes. First, the engagement secures the cartridge C in place during advancement of an exposed section of the film onto the take-up drum 11 each time the drum is rotated. Second, after the entire length of film (except for an end portion connected to the film spool) has been exposed and wound onto the take-up drum 11, such engagement permits the rewind shaft 59 to rotate the film spool to rewind the exposed film into the film cartridge C. The rewind shaft 59 is rotated by manually operated or motorized means, not shown. A control arm 71 is connected to the rewind shaft 59 to support the shaft for movement into and from the cartridge chamber 3 to engage and disengage the film spool. As partially shown in FIG. 8, the control arm 71 has two aligned slots 73 through which respective pins 75 fixed to the camera body 1 extend to enable movement of the rewind shaft 59 into and from the cartridge chamber 3. Part-way during closing movement of the camera back 13, an inclined cam surface 77 fixed to the camera back is brought into motion imparting contact with a cam follower pin 79 located on the control arm 71. The cam follower pin 79 extends through a slot 81 in the camera body 1. Movement of the cam surface 77 against the cam follower pin 79, in response to closing movement of the camera back 13, moves the rewind shaft 59 into the cartridge chamber 3 and into engagement with the film spool. Conversely, opening movement of the camera back 13 uncouples the cam surface from the cam follower pin 79, permitting a spring 83 connecting the camera body 1 and the control arm 71 to move the rewind shaft 59 from the cartridge chamber 3 and out of engagement with the film spool.

Operation

The preferred embodiment is operated as follows. With the camera back 13 in its fully opened position, shown in FIG. 1, the film cartridge C is positioned in the cartridge chamber 3, preferably with the film leader L pointing towards the take-up drum 11 in the take-up chamber 9. Then, the camera back 3 is moved to close the back portion of the camera body 1, causing the film leader L to be threaded by the film-engaging projections 33 and 35 to the take-up drum 11, and moving the rewind shaft 59 into engagement with the film spool in the film cartridge C. After exposure of the film is completed, the rewind shaft 59 is rotated to rotate the film spool to rewind the film into the cartridge C. Finally, opening movement of the camera back 3 disengages the rewind shaft 59 from the film spool, permitting the film cartridge to be removed from the cartridge chamber 3.

While the invention has been described with reference to a preferred embodiment, it will be understood that various modifications may be effected within the ordinary skill in the art without departing from the scope of the invention. For example, instead of using the spring 83 to move the rewind shaft 59 from the cartridge chamber 3 and out of engagement with the film spool in the film cartridge C, an inclined cam surface may be provided for such purpose. The inclined cam surface may be fixed to the camera back 13 in parallel spaced relation with the cam surface 77 on the camera back. Opening movement of the camera back 13, therefore, would move the inclined cam surface into motion imparting contact with the cam follower pin 79 on the control arm 71, causing the rewind shaft 59 to be moved from the cartridge chamber 3 and out of engagement with the film spool in the film cartridge C. Appropriate means, such as an extension of the inclined cam surface, would maintain the rewind shaft 59 disengaged from the film spool as long as the camera back 13 is in its fully opened position.

Although, in the preferred embodiment, an exposed section of the film is wound onto the take-up drum 11 each time the drum is rotated, it is equally possible to wind the unexposed length of film (except for its end portion connected to the spool in the cartridge C) onto the take-up drum. Then, after each film exposure, the exposed section of film may be rewound into the cartridge C by rotating the rewind shaft 59 an appropriate increment.

We claim:

1. In a photographic camera of the type provided with (a) a chamber adapted to receive a film cartridge having an engageable spool about which the film is wound, (b) take-up means for advancing the film from the cartridge, (c) a rewind member movable in said chamber into engagement with the spool for rotating the spool to rewind the film into the cartridge, and (d) a camera back movable to open and close said chamber, the improvement comprising:
   first motion imparting means for moving said rewind member into engagement with the spool in response to closing movement of said camera back; and
   second motion imparting means for moving said rewind member out of engagement with the spool in response to opening movement of said camera back.

2. In a photographic camera of the type provided with (a) a chamber adapted to receive a film cartridge having an engageable spool about which the film is wound, (b) take-up means for advancing the film from the cartridge, (c) a rewind member movable in said chamber into engagement with the spool for rotating the spool to rewind the film into the cartridge, and (d) a camera back movable to open and close said chamber, the improvement comprising:
   means supporting said camera back for closing movement in the same direction said take-up means advances the film from the cartridge;
   motion imparting means for moving said rewind member into engagement with the spool in response to closing movement of said camera back; and
   threading means connected to said camera back for engaging the film to thread the film to said take-up means during closing movement of said camera back.

3. The improvement as recited in claim 2, wherein said motion imparting means includes respective means connected to said rewind member and said camera back for coupling the two to move said rewind member into engagement with the spool in response to closing movement of said camera back.

4. The improvement as recited in claim 3, wherein said respective means includes camming means fixed to said camera back and a cam follower connected to said rewind member.

5. The improvement as recited in claim 2, wherein said threading means includes a film-engaging member urged to engage the film and separating means located proximate said take-up means for disengaging said film-engaging member from the film as closing movement of said camera back is completed.

6. In a photographic camera of the type provided with (a) a chamber adapted to receive a film cartridge having an engageable spool about which the film is wound, (b) take-up means for advancing the film from the cartridge, (c) a rewind member movable in said chamber into engagement with the spool for securing the cartridge in place during advancement of the film from the cartridge and for rotating the spool to rewind the film into the cartridge, and (d) a camera back movable to open and close said chamber, the improvement comprising:
   means for coupling said rewind member and said camera back to move said rewind member into engagement with the spool in response to closing movement of said camera back, and for uncoupling said rewind member and said camera back to permit said rewind member to be moved out of engagement with the spool in response to opening movement of said camera back; and
   means for urging said rewind member to move out of engagement with the spool.

7. The improvement as recited in claim 6, wherein said camera back is supported for closing movement in the same direction said take-up means advances the film from the cartridge, and a projection is mounted on said camera back for engaging the film to thread the film to said take-up means during closing movement of said camera back.

* * * * *